United States Patent [19]

Krayenhagen

[11] Patent Number: 5,415,611
[45] Date of Patent: May 16, 1995

[54] WEB TENSION CONTROL SYSTEM

[76] Inventor: Everett D. Krayenhagen, 1717 Capri La., Richmond, Ind. 47374

[21] Appl. No.: 124,811

[22] Filed: Sep. 21, 1993

[51] Int. Cl.$^6$ ............................................. B23P 15/00
[52] U.S. Cl. ........................................ 492/16; 492/22; 492/45
[58] Field of Search ...................... 492/16, 17, 18, 20, 492/22, 45; 101/415.1

[56] References Cited

U.S. PATENT DOCUMENTS 3,803,682  4/1974  Stein ....................................... 492/16

FOREIGN PATENT DOCUMENTS 563092  6/1960  Belgium ................................. 492/16
0006542  11/1913  United Kingdom .................. 492/16

Primary Examiner—Irene Cuda

[57] ABSTRACT

A web tension control system includes a stationary rod and a roller attached to the rod by a flexible coupling. A bearing is attached to the inner surface of the roller. The flexible coupling is attached, at one end, to the rod, and, at a second end to the inner portion of the bearing. The inner portion of the bearing is attached to the flexible coupling. One embodiment enables the roller to pivot about a central location where the bearing is attached to the inner surface of the roller. Another embodiment provides full pivotal freedom for the roller to angularly rotate about a central location through a limited range of angular displacement.

15 Claims, 4 Drawing Sheets

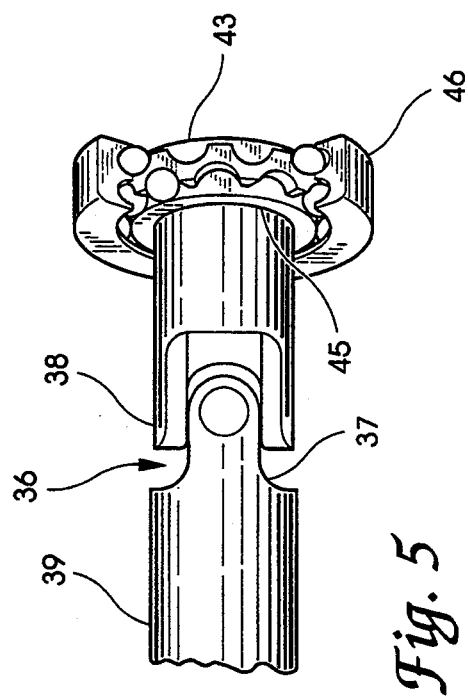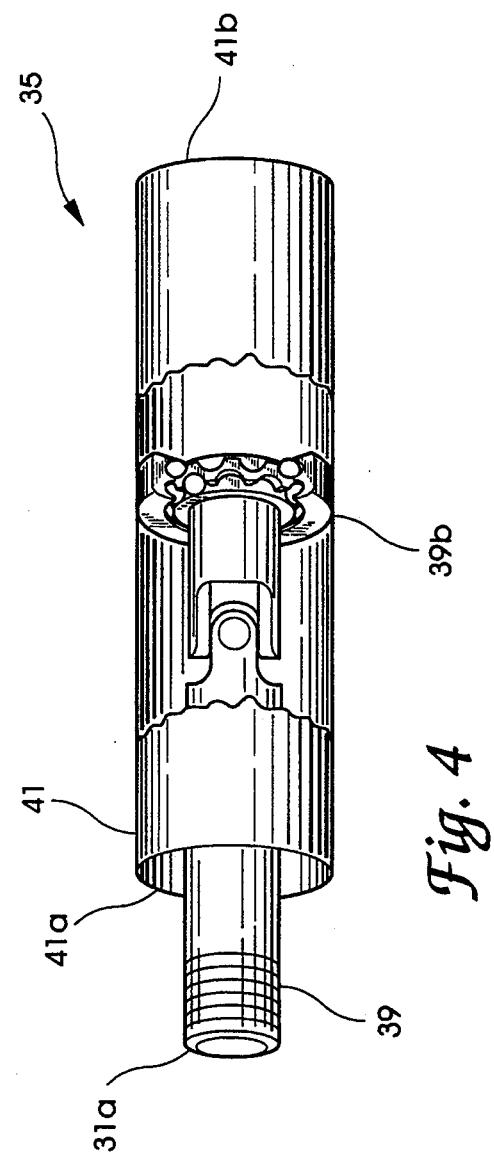

WEB TENSION CONTROL SYSTEM

BACKGROUND OF THE INVENTION

The present invention relates to a web tensioning devices for use in the manufacture of continuous web substrates, and in particular, to a device that automatically adjusts its angular orientation to equalize the tension across a moving web.

In the manufacture or combining processes of metallic, plastic, woven, non-woven, paper, and webs of other substances, the web substrate normally contacts idler rolls while moving within a manufacturing machine. If the tension exerted by the web substrate on one end of the idler roller is greater than the tension exerted on the other end of the same idler roller, a variety of problems result that negatively affect the end product.

The causes that contribute to uneven tension may be inherent in the web substrate itself as having occurred during its formation, or the uneven tension may be mechanically induced by machine misalignment. The result of poor tension control is a finished product of lower or unacceptable quality. The finished product may be stretched, warped, or be subjected to nonuniform application of a variety of coatings and adhesives. Stretching generally deforms the substrate permanently and may render it useless as a finished product.

Warp is most common in paper products and is a result of uneven tension across a web experienced during the heating application. This uneven heat application causes more moisture to be evacuated from one side of the web than the other. The result is that one side of the web will shrink more than the opposite side and cause a curve to occur at the combining process. If the proximity of the substrate to laminating, adhesive, printing, and other coating applications is not maintained the application will be uneven and result in an inferior finished product. One way to avoid this is by controlling tension across the web to insure that the substrate maintains a uniform distance to or tension against the application.

Controlling the tension across the width of a substrate or web reduces weaving. Weaving in continuous webs or belts is caused by the substrate attempting to pull to the high tension side during machinery operation and is most common during equipment speed changes. By effectively equalizing the tension across the web, this condition is nullified. Tension control expands the application of this device to assist in maintaining control over the direction of travel of belting and other like conveyance methods.

What is needed is a web tension control system that automatically equalizes the tension across a web during the manufacturing process.

SUMMARY OF THE INVENTION

A tension control system, in accordance with one aspect of the present invention, comprises a hollow cylindrical roller engagable with a moving web, the roller having a first end and an opposite end, a cylindrical bearing having an inner diameter surface and an outer diameter surface, the bearing is located between the first end of the roller and the opposite end of the roller, and the bearing permits the roller to rotate on the bearing outer diameter surface, a shaft disposed within the roller, the shaft has a first end and an opposite end, pivot means for pivotally connecting the roller to the shaft, the pivot means pivots the roller perpendicular to the axis of rotation of the roller in response to tension variations in the web, and the pivot means is connected to the inner diameter surface of the bearing, and means for mounting the shaft, the means for mounting the shaft provides a predetermined force to the shaft.

One object of the present invention is to provide a device that improves the quality of combined web substrates.

Another object of the present invention is to provide a device that automatically equalizes the tension across a moving web.

Still another object of the present invention is to provide an improved web tensioning device.

Other objects and advantages of the present invention will be apparent from the following description of the preferred embodiments.

BRIEF DESCRIPTION OF THE DRAWINGS

FIG. 4 is an isometric view of a web tensioning device according to another aspect of the present invention.

FIG. 5 is a side elevational view of a pivot assembly according to another aspect of the invention.

DESCRIPTION OF THE PREFERRED EMBODIMENT

Figure 3:
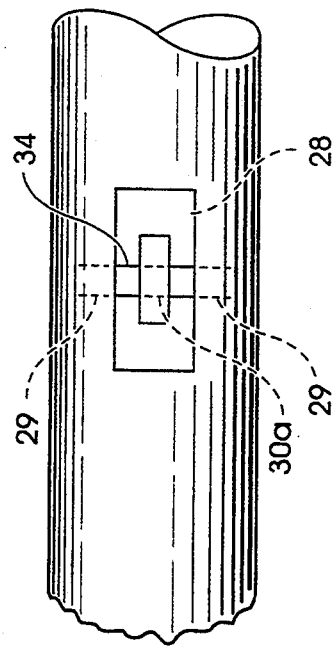
FIG. 3 is a top view of the pivot assembly of FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
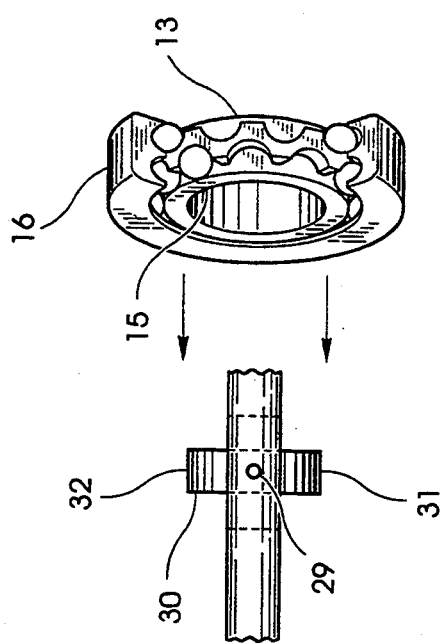
FIG. 2 is a partial side elevational view of a pivot assembly according to one aspect of the present invention.
Figure 1:
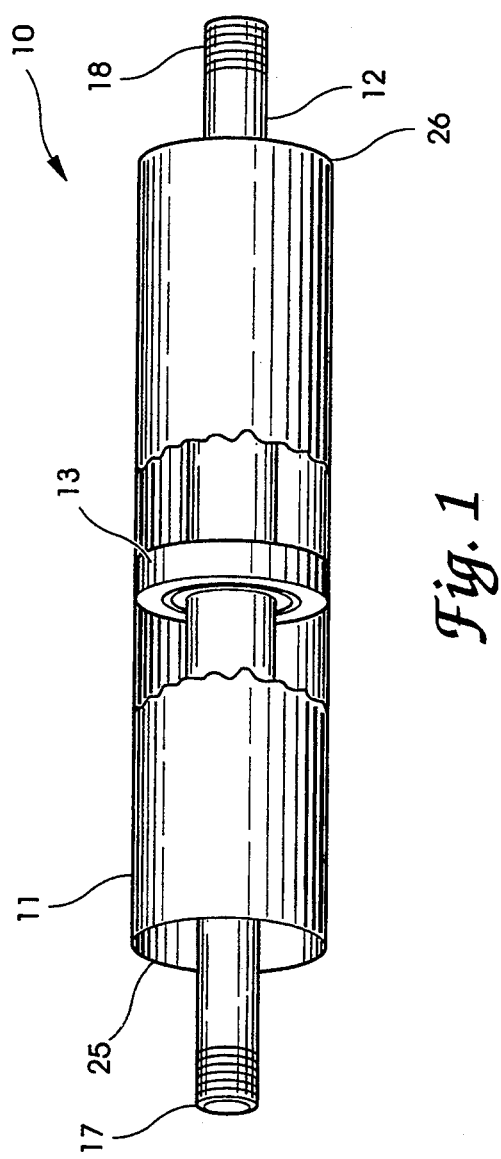
FIG. 1 is a front isometric view of a web tensioning device according to the present invention.

Referring now to FIGS. 1, 2, and 3, a web tension control system 10 is shown. System 10 includes a hollow cylindrical roller 11 that rotates about a shaft 12. A flexible coupling or pivot assembly 14 provides a flexible mechanical connection between the roller 11 and the shaft 12. Pivot assembly 14 enables roller 11 to pivot about an axis perpendicular to the axis of rotation of the roller. A bearing 13, that forms part of the pivot assembly 14, provides a mechanical support for the roller 11 and enables roller 11 to rotate relative to shaft 12.

Figure 6:
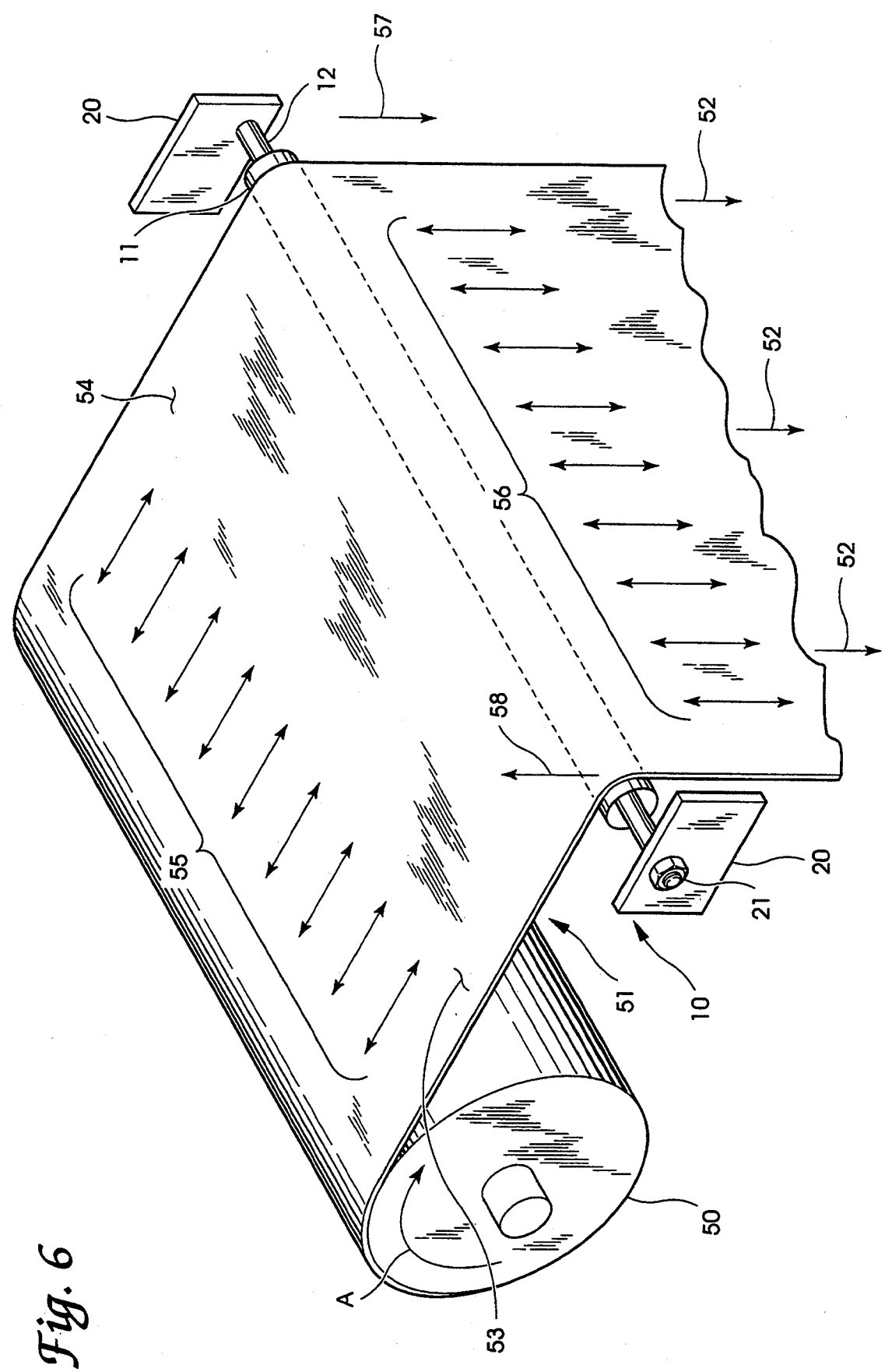
FIG. 6 is an isometric view of a web tensioning device according to the present invention shown in contact with a moving web.

The tension control system 10 is attached to and positioned within manufacturing equipment as shown in FIG. 6.

Figure 7:
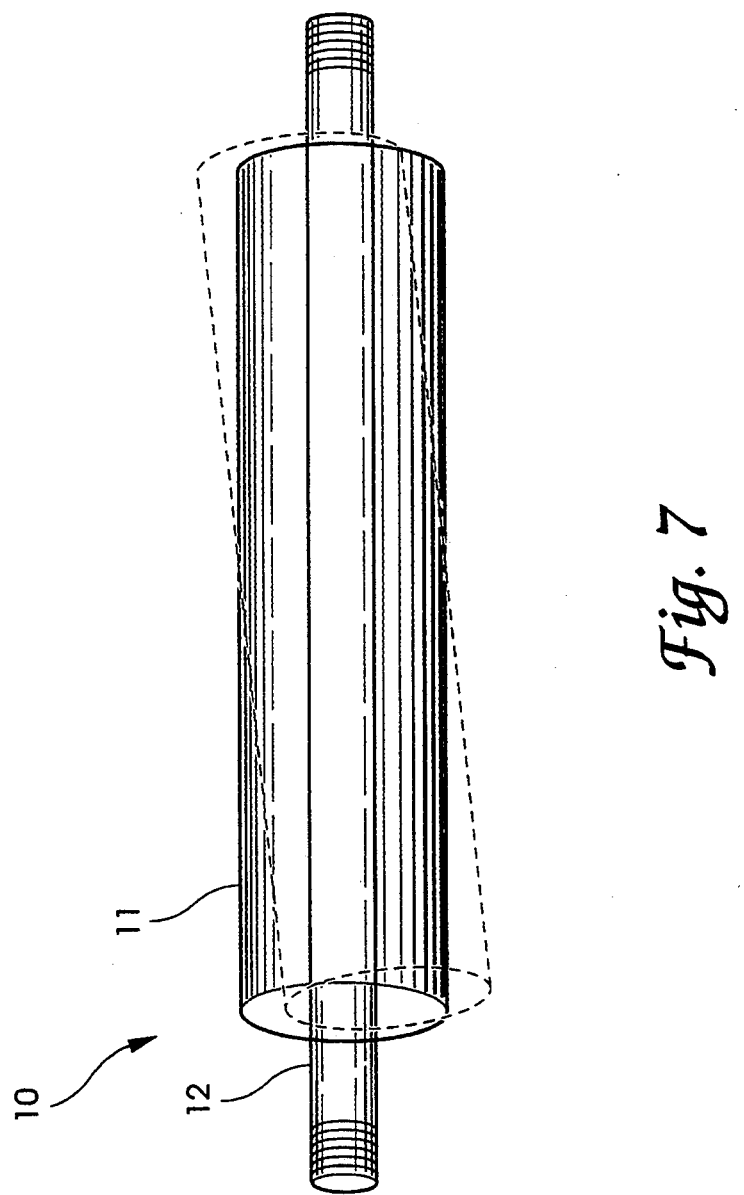
FIG. 7 is a front isometric view of the web tensioning device of FIG. 1 depicting one alternate position of the roller.

Roller 11 automatically pivots in response to tension variations in a moving web. (The pivoting capability of roller 11 is shown in FIG. 7 by broken lines.)

Referring now to FIG. 6, a web 51 is unwound from a supply roll 50 over roller 11 and down into a manufacturing process. The moving web has a velocity in the direction of arrow A. Before encountering roller 11, the web 51 has a tension distribution 55 that increases from the left side 53 to the right side 54. If roller 11 were left unadjusted, the web 51 would exert a stronger force at the right side 54 because of the increased tension whereas the left side 53 would be relatively loose against roller 11 because of the lower tension. The web tension control system 10 responds to the situation by pivoting the roller about an axis perpendicular to the axis of rotation such that the roller 11 assumes a new equilibrium position. The pivoting movement lowers the right side of roller 11 in the direction of arrow 57, whereas the left side of roller 11 rises in the direction of arrow 58. The pivoting of roller 11 results in the tension in the paper web 54 being uniformly distributed so the tension 56 at all points across the width of the web is equalized.

Referring again to FIGS. 1, 2, and 3, a steel shaft 12 having a one inch outside diameter extends through a hollow cylindrical steel roller 11 having a three inch inside diameter and an outer diameter slightly larger than three inches. Shaft 12 has a first end 17 and a second end 18. Both ends 17 and 18 extend outboard of roller 11. The roller 11, having a first end 25 and a second end 26, is engagable with a moving web.

The moving web 51, as shown in FIG. 6, rotates roller 11 about its axis of rotation, relative to shaft 12 in the direction of movement of the web. End 17 and end 18 are externally threaded to permit flexibility in the installation of the web tension control system in a manufacturing process. In one embodiment, ends 17 and 18 are connected to a mounting plate 20. End 17 and end 18 pass through a clearance hole in mounting plate 20 and are secured using hex nuts 21 or other known fasteners.

The pivot assembly 14 (of FIG. 2) includes a rectangular hole 28 in shaft 12 substantially centrally located between the first end 17 of shaft 12 and the second end 18. A cylindrical hole 29 is centrally located between the end 17 and end 18, and intersects hole 28. Bearing 13 includes an inner diameter surface 15 and an outer diameter surface 16. Bearing 13 is attached to the inner surface of roller 11 and is substantially centrally located between the first end 25 of roller 11 and the second end 26 of roller 11. Bearing 13 is attached to roller 11 or "press-fit" into position within the interior of roller 11.

Pivot member 30 includes end 31 and end 32. The distance separating ends 31 and 32 is substantially equivalent to the inside diameter of bearing 13. The pivot member 30 has a cylindrical hole centrally located between end 31 and end 32. Pivot member 30 is positioned within the rectangular hole 28 of shaft 12 such that cylindrical hole 30a is aligned with hole 29. Pivot member 30 is pivotally mounted to shaft 12 by pin fastener or pin 34 extending through shaft 12 and pivot member 30. Fastener 34 is rigidly attached to shaft 12 within hole 29.

The pivoting of roller 11 is limited such that the first end 25 of roller 11 and the second end 26 of roller 11 do not contact shaft 12. The rectangular hole 28 in shaft 12 is sized such that it limits the angular range that pivot member 30 can move, thereby preventing roller 11 from contacting shaft 12.

Fastener 34 is a cylindrical steel pin, however, other embodiments include, for example, a bolt having a bearing surface that corresponds to the cylindrical surface of the hole in the pivot rod. Fastener 34 is fixedly mounted to shaft 12 by an interference fit between the fastener and the cylindrical surface of hole 29. End 31 and end 32 are mounted to the inner diameter surface 15 of bearing 13. Pivot rod 30 is press fit within the inner diameter of bearing 13. Alternatively, pivot rod 30 can be affixed to the bearing 13 by welding the pivot rod 30 to the bearing 13, or using a spring biased retaining ring.

A second web tension control system 35, as shown in FIGS. 4 and 5, includes a steel shaft 39 having a three-quarter inch outside diameter extending partially into or through a hollow cylindrical steel roller 41 having a two inch inside diameter. Shaft 39 has a first end 39a and a second end 39b. Roller 11 has a first end 41a and a second end 41b, and is engagable with a moving web.

The moving web rotates roller 41 about its axis of rotation relative to shaft 39 in the direction of movement of the web. The first end 39a is externally threaded to permit flexibility in the installation of the web tension control system 35 in a manufacturing process. The first end 39a of shaft 39 may be connected to a spring biased mounting assembly 20, as shown in FIG. 6.

Bearing 43 has a one inch inner diameter 45 and a two inch outer diameter 46, and is centrally located between the first end 41a of roller 41 and the second end 41b of roller 41.

The flexible coupling 36 is a universal joint and includes end 37 and end 38. End 37 is attached to end 39a of shaft 39. End 38 is attached to the inner diameter surface 45 of bearing 43. In this embodiment end 37 is welded to end 39b of shaft 39. Bearing 43 is press fitted onto end 38 of coupling 36. The advantage of the embodiment shown in FIGS. 4 and 5 (over the embodiment of FIGS. 1, 2, and 3) is that complete freedom of movement is provided by universal joint 36 and the rotational position of shaft 39 is not critical, as it is in the mounting of the FIG. 1, 2, and 3 embodiment, to provide and enable roller angular displacement in a desired plane.

FIG. 7 provides an illustration of how the roller 11 of device 10 can be repositioned to another angular position with respect to shaft 12 by forces attributable to a web. It should be understood that device 35 is fully capable of a similar position. Further, device 35 provides greater functional flexibility, as discussed above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tension control system, comprising:
   a hollow cylindrical roller engagable with a moving web, said roller having a first end and an opposite second end:
   a shaft disposed within said roller, said shaft having a first end and a second end;
   a bearing having an inner diameter surface and an outer diameter surface, said beating being located between said first end of said roller and said second end of said roller, and said roller being rotatable on said beating relative to said shaft;
   pivot means for pivotally connecting said bearing to said shaft, said pivot means enabling said roller to pivot about an axis perpendicular to the axis of rotation of said roller in response to tension variations in the web, and said pivot means being attached to said inner diameter surface of said bearing; and attachment means attached to said shaft for fixedly positioning said shaft in place.

2. The tension control system of claim 1 wherein:

said shaft has an aperture formed axially therein, said aperture being located between said first end of said shaft and said second end of the shaft;

said shaft includes a radial bore, said bore being located between said first end of the shaft and said second end of the shaft; and wherein said pivot means includes a pivot member pivotally mounted within said bore in said shaft, said inner diameter surface of said bearing being attached to said pivot member.

3. The tension control system of claim 2 wherein said bearing is cylindrical, and wherein said outside diameter surface of said bearing is attached to said roller.

4. The tension control system of claim 3 wherein said attachment means includes first and second mounting plates attached to the first and second ends, respectively, of said shaft.

5. The tension control system of claim 4 wherein:

each of said first and second mounting plates has a clearance hole formed therein, said first and second ends of said shaft passing through corresponding ones of said clearance holes in said mounting plate; the ends of said shaft being threaded; and a threaded fastener being attached over said threaded ends and securing said first and second plates to said shaft.

6. The tension control system of claim 1 wherein said pivot means is a universal joint.

7. A tension control system, comprising:

a hollow cylindrical roller engagable with a moving web, said roller having a first end and a second end;

a shaft disposed within said roller, said shaft having a first end and a second end;

a bearing having an inner diameter surface and an outer diameter surface, said roller being attached to and rotatable on said bearing relative to said shaft; and a coupling pivotally connecting said bearing to said shaft, said coupling being attached to said inner diameter surface of said bearing, said coupling enabling said roller to pivot about an axis substantially perpendicular to the axis of rotation of said roller in response to tension variations in the web.

8. The tension control system of claim 7 wherein:

said shaft includes a radial hole formed therein; and wherein said coupling includes a pivot rod fixedly disposed within said hole in said shaft, said bearing being mounted to the ends of said pivot rod.

9. The tension control system of claim 7 wherein:

said shaft includes a radial hole formed therein; and wherein said coupling includes a pivot rod disposed within said hole, said bearing being mounted to the ends of said pivot rod, said outside diameter surface of said bearing being affixed to said roller, said coupling further having a pin disposed within said bore in said shaft, said rod being pivotally mounted on said pin.

10. The tension control system of claim 7 wherein said coupling is a universal joint.

11. A tension control system, comprising:

roller means for engaging a moving element, said roller means having a first end and a second end and having a hollow interior;

a shaft disposed within said hollow interior of said roller means, said shaft having a first end and a second end;

a bearing having an inner diameter surface and an outer diameter surface, the inner surface of said hollow cylindrical roller being attached to the outer diameter surface of said bearing; and a pivot device pivotally attaching said bearing to said shaft, wherein said pivot device is attached to said inner diameter surface of said bearing, said pivot device enabling said roller means to pivot about an axis perpendicular to the axis of rotation of said roller means in response to tension variations in the web.

12. The tension control system of claim 11 wherein:

said shaft has a bore formed radially therein; and wherein said pivot device includes a pivot rod disposed within said bore of said shaft, said rod being mounted to the inner diameter surface of said bearing, said pivot device further having a pin disposed within said bore in said shaft, said rod being pivotally mounted on said pin.

13. The tension control system of claim 12 wherein said bearing is cylindrical, and wherein said outside diameter surface of said bearing is mounted to said roller.

14. The tension control system of claim 13, additionally comprising:

first and second mounting plates attached to the first and second ends, respectively of said shaft.

15. The tension control system of claim 14 wherein said pivot assembly is a universal joint having a first end and a second end, said first end of said universal joint being connected to said second end of said shaft, said second end of said universal joint being attached to the inner diameter surface of said bearing.

* * * * *